United States Patent [19]
Saft

[11] Patent Number: 4,929,311
[45] Date of Patent: May 29, 1990

[54] APPARATUS FOR DEODORIZING AN ORGANIC LIQUID

[75] Inventor: Helmut Saft, Niddatal, Fed. Rep. of Germany

[73] Assignee: Metallgesellschaft Aktiengesellschaft, Frankfurt am Main, Fed. Rep. of Germany

[21] Appl. No.: 344,659

[22] Filed: Apr. 27, 1989

[30] Foreign Application Priority Data

Apr. 27, 1988 [DE] Fed. Rep. of Germany ....... 3814255

[51] Int. Cl.$^5$ ............................ B01D 3/10; B01D 3/38
[52] U.S. Cl. ........................ 202/158; 55/198; 202/205; 202/234; 261/124; 261/DIG. 76
[58] Field of Search .................. 202/158, 205, 234; 203/92, 96; 261/114.1, 124, DIG. 76; 55/198

[56] References Cited

U.S. PATENT DOCUMENTS

| | | | |
|---|---|---|---|
| 2,184,579 | 12/1939 | Brucke | 202/234 |
| 3,693,322 | 9/1972 | Lineberry | 261/124 |
| 4,036,865 | 7/1977 | Hartmann et al. | 203/92 |
| 4,483,747 | 11/1984 | Aruga et al. | 203/92 |

*Primary Examiner*—Joye L. Woodard
*Attorney, Agent, or Firm*—Herbert Dubno

[57] ABSTRACT

The deodorizing apparatus is used to treat organic liquids, such as edible oils or edible fats, in that they are stripped with water vapor under subatmospheric pressure and at temperatures from about 130° to 260° C. Free fatty acids and disturbing taste- and odor-imparting substances are thus removed. The liquid to be treated is passed through one or more treating stories and is agitated therein by rising water vapor. At least one of the treating stories comprises at least two concentric, open-topped annular passages having a common cylindrical wall, a vertical partition extending across the wall and an aperature in the wall adjacent the partition for allowing liquid flow between the passages. A plurality of circulating cylinders, which are adapted to be flown through in an upward direction, are arranged in each annular passage. Water vapor in the form of fine bubbles is passed through the circulating cylinders.

4 Claims, 1 Drawing Sheet

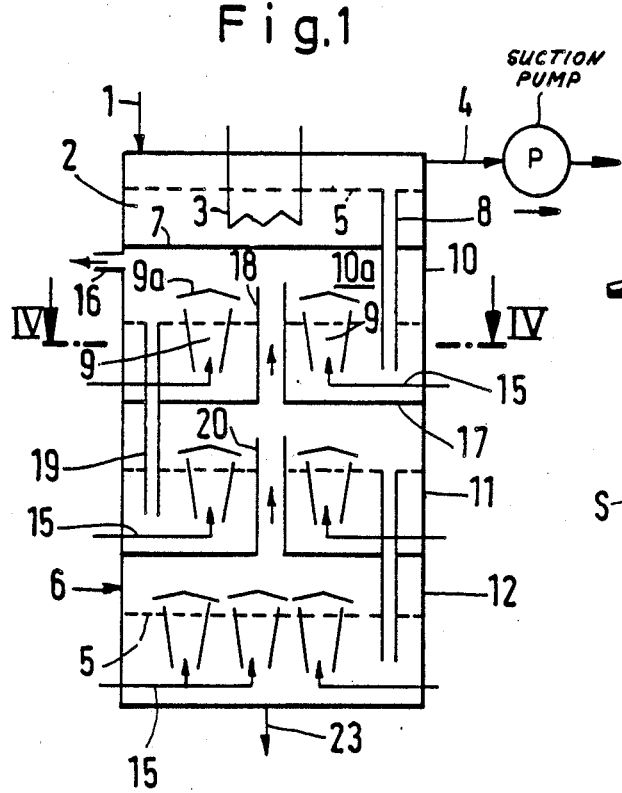
Fig.1
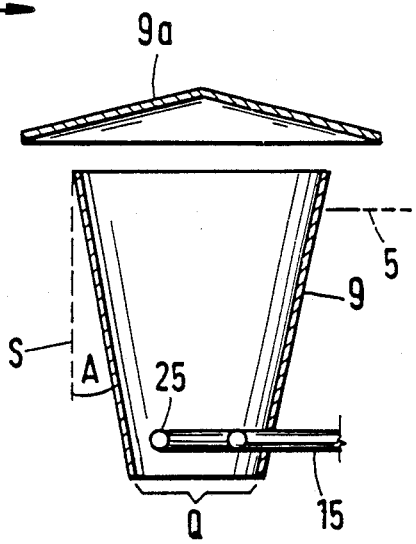
Fig.2
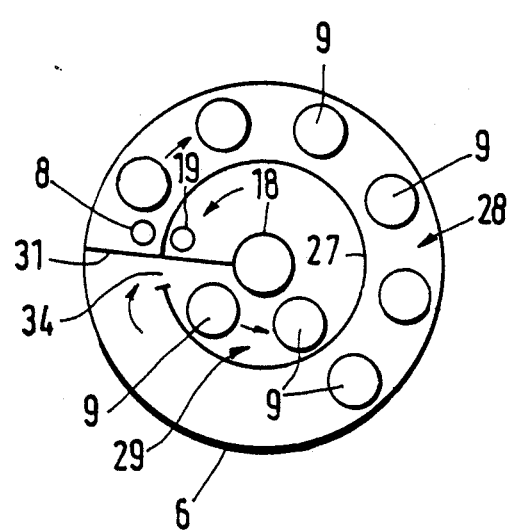
Fig.4
Fig.3

APPARATUS FOR DEODORIZING AN ORGANIC LIQUID

CROSS REFERENCE TO RELATED APPLICATION

This application is related to the commonly owned copending application filed concurrently herewith (Ser. No. 07/344,650).

FIELD OF THE INVENTION

My present invention relates to an apparatus for deodorizing an organic liquid by stripping with water vapor under superatmospheric pressure and at temperatures of about 130° to 260° C., wherein the liquid to be treated is passed through one or more treating stories or levels (stages) and is agitated and stripped therein by rising water vapor (steam).

BACKGROUND OF THE INVENTION

Deodorizing apparatus of this type usually serves primarily to remove free fatty acids and disturbing taste- and odor-imparting substances from, for example, edible oils or edible fats.

The stripping is usually effected with steam under a pressure in the range from about 2 to 8 millibars. The treatment is carried out below the boiling temperature of the organic liquid. Excessively high temperatures would adversely affect the taste and appearance of the treated product.

OBJECT OF THE INVENTION

It is an object of the invention to provide a deodorizing apparatus which is as effective as possible and to pass the liquid to be treated through the apparatus without dead zones.

SUMMARY OF THE INVENTION

This is accomplished in accordance with the invention in that at least one of the treating levels comprises one or more concentric, open-topped annular passages and a plurality of circulating ducts which re adapted to be traversed by the liquid in an upward direction are arranged in each annular channel and in their lower portion are provided with a water vapor inlet.

Usually the treating levels and at least one of them will have at least two concentric annular passages.

According to the invention, therefore, the apparatus can comprise:

a treatment vessel;

means connected with the treatment vessel for applying a subatmospheric pressure thereto;

means in the treatment vessel defining at least one treatment level upon which a body of predetermined height of an organic liquid to be deodorized is maintained and forming at the level at least one upwardly open annular channel along which the body of liquid is conducted on the level;

at least one upwardly open circulating duct in the channel receiving the liquid from below and traversed upwardly by the liquid whereby the liquid overflows from an upper edge of the duct, the circulating duct having the configuration of a surface of revolution centered substantially upon an upright axis; and means for introducing water vapor into the duct at a lower portion thereof for stripping the liquid with the water vapor and for inducing upward flow of the liquid in the duct.

The vessel can be provided with a succession of the levels in vertically spaced relationship, and can further comprise means for conducting the liquid from each level above another level downwardly to the other level upon flow of the respective body of liquid to an end of a path along a respective annular channel.

The apparatus can have means for delivering the liquid to be deodorized to an uppermost one of the levels at a beginning of the respective path of the liquid on the uppermost level. Each of the levels is advantageously formed with at least two of the annular channels disposed concentrically. The annular channels of each level can be connected in series to be traversed by the liquid in succession in flowing from the respective beginning to the respective end of the respective path.

Advantageously, a plurality of the ducts are provided in spaced relationship along each of the paths and annular channels of each of the levels, and each of the ducts is provided with a respective means for introducing water vapor to the respective duct at a lower portion thereof.

Each of the ducts can have an upwardly flaring frustoconical shape with a conical half-angle A including with a vertical an angle of substantially 5° to 20°. The means for introducing water vapor can be a respective annular conduit coaxial with the respective duct at the respective lower portion thereof and formed with a multiplicity of bores discharging water vapor into the liquid within the respective duct.

The apparatus advantageously also comprises a respective downwardly diverging conical baffle spaced above the duct and projecting outwardly beyond an edge thereof.

The circulating ducts arranged in the annular channels may have various shapes. In one possible design, a short tube or cylinder is used for that purpose. In an improved design, the circulating cylinder has an upwardly flaring shape and the cone angle measured from the vertical is 5 to 20 degrees. The height of the circulating cylinders is in the range from 0.3 to 1.5 meters.

Various kinds of nozzles can be used for the water vapor inlet. It will be essential that the water vapor is introduced into the inner region of the circulating duct in the form of bubbles which are as fine as possible and in a good distribution. For this purpose, the annular conduit provided with numerous bores is preferably used.

If the circulating duct has an upwardly opening conical shape, the bubbles of water vapor will rise at a lower velocity.

Because the water vapor stays for a longer residence time in the circulating duct which contains also the liquid to be treated, the contact between the vapor and the liquid is intensified and the entraining of the undesired substances by the water vapor is improved.

BRIEF DESCRIPTION OF THE DRAWING

The above objects, features and advantages of my invention will become more readily apparent from the following description, reference being made to the accompanying drawing in which:

FIG. 1 is a highly diagrammatic longitudinal sectional view showing a deodorizing apparatus;

FIG. 2 is a longitudinal sectional view showing a conical circulating cylinder;

FIG. 3 is a top plan view showing an annular conduit for feeding water vapor; and FIG. 4 is a somewhat enlarged transverse sectional view taken on line IV—IV of FIG. 1, showing only one level thereof.

SPECIFIC DESCRIPTION

The liquid to be treated, such as an edible oil or edible fat, is fed in a liquid state through line 1 to the deodorizing apparatus, which is diagrammatically shown in FIG. 1.

The apparatus consists of a column having a cylindrical housing wall 6, see also FIG. 4. The liquid first enters a heating chamber 2, which contains a heater 3, and is heated there to temperatures of 180° to 260° C. Gases and vapors evolved thereby may be removed through line 4 (via a suction pump 4a maintaining the subatmospheric pressure in the vessel). A broken horizontal line 5 indicates the liquid level in the chamber 2 and in the subsequently described treating stories of the deodorizing apparatus.

The chamber 2 has a liquid-tight bottom 7 and a drain pipe 8, through wich the liquid is supplied to the uppermost treating level 10. That story contains numerous circulating ducts 9, only two of which are shown in FIG. 1 for the sake of clearness. Each circulating duct is supplied from the outside through a line 15 with water vapor, which rises in the duct 9 in the form of fine bubbles and by an airlift action agitates liquid and entrains undesired substances initially into the gas space 10a of the treating story. Gases and vapors are sucked from there through the outlet 16. Each circulating duct 9 has associated with it a baffle 9a, which is disposed in the gas space and particularly ensures that liquid droplets will be caught and conducted back into the liquid.

The bottom 17 of the treating level 10 is provided with a central riser 18, through which gases and vapors from the underlying treating level 11 are conducted upwardly to the gas space 10a and then to the outlet 16.

The treating level 11 has the same basic design as the level 10. It is supplied with liquid from the next upper level 10 through the drain pipe 19. From the level 11 the liquid then enters the lowermost treating level 12, which differs from the overlying levels 10 and 11 in that it has no central duct.

Gases and vapors flow from the lowermost level 12 first through the riser 18 to the outlet 16. Treated liquid is withdrawn in line 23 and is first conducted through a cooler, which may alternatively be integrated in the deodorizer but has been omitted in the drawing.

The circulating duct 9 which is shown on a larger scale in FIG. 2 consists of an upwardly flaring conical tube. The cone angle (A) measured against the vertical (S) amounts to 5° to 20°. A baffle 9a is spaced over the duct 9 and ensures that liquid droplets entrained by the rising water vapor will be caught and conducted back into the liquid. During operation, the duct 9 protrudes somewhat over the liquid level, as is indicated by the broken line 5 which indicates the liquid level.

The water vapor which effects the treatment is supplied in line 15 to each circulating duct 9, (see FIGS. 1-3), and through an annular conduit 25, which is seen in a top plan view in FIG. 3, exits into the interior of the duct 9. The annular conduit 25 is provided with numerous bores 26 (see FIG. 3) through which the water vapor escapes. This results in the desired finely dispersed distribution of the water vapor and the annular conduit also ensures that the water vapor will flow in the circulating duct 9 through all regions in the interior of the duct and centrally rising large bubbles will not form.

The circulating duct 9 (see particularly FIG. 2), usually has a height of 0.3 to 1.5 meters without the baffle 9a. The ratio of the smallest cross-section (Q) to the height of the cylinder is in the range from 1:3 to 1:15.

FIG. 4 is a diagrammatic horizontal sectional view showing how a treating level may be designed. A vertical cylindrical wall 27 is provided, which is concentric to the central riser 18 and is liquid-tightly connected to the bottom of the level and defines an outer annular passage 28 with the housing wall 6 and an inner annular passage 29 with the riser 18. Regularly spaced apart circulating ducts 9 are installed in the two annular passages 28 and 29. Only a few of these ducts are indicated in FIG. 4 for the sake of clearness. A vertical partition 31 extends between the housing wall 6 and the central riser 18. The walls 27 and 31 have about the same height as the riser 18 so that the gases and vapors can flow freely through the gas space 10a (see FIG. 1) in each treating level. The walls 27 and 31 are not shown in FIG. 1.

The liquid to be treated initially flows through the supply line 8 into the outer annular passage 28 and flows therein in a clockwise sense from one circulating duct 9 to the other and is treated with water vapor in each of the ducts for a certain residence time. The supply lines for water vapor have not been shown in FIG. 4. The liquid finally flows through the aperture 34 in the cylindrical wall 27 into the inner annular passage 29 and flows in the latter in a counterclockwise sense. In the passage 29, the liquid is successively treated in the ducts 9 which are closely spaced apart. The liquid finally enters the drain pipe 19 and flows into the next lower treating story.

Each treating story may be provided with a plurality of annular passages, which are consecutively flown through, or with only a single annular passage. The circulating ducts 9 in each annular passage constitute a circular array. The lowermost treating story 12 may also comprise one or more of such annular passages. The number of treating levels may vary and is usually between one and five.

I claim:

1. An apparatus for deodorizing an organic liquid. comprising:

a treatment vessel;

means connected with said treatment vessel for applying a subatmospheric pressure thereto;

means in said treatment vessel defining at least one treatment level upon which a body of predetermined height of an organic liquid to be deodorized is maintained and forming at said level at least two concentric upwardly open annular channel-like passages along which said body of liquid is conducted on said level, said concentric passages having a common cylindrical wall and a vertical partition extending across said passages transversly of the common wall, and an aperture in said wall adjacent said parition for allowing liquid flow between said passages;

each passage having a plurality of downwardly and upwardly open circulating ducts arranged in spaced relationship along each passage, each duct receiving said liquid from below and being traversed upwardly by said liquid whereby said liquid overflows from an upper edge of said duct, each circulating duct having a frustoconical shape diverging upwardly with a cone angle A, measured against the vertical, of substantially 5° to 20°; and
means for introducing water vapor into said duct at a lower portion thereof for stripping said liquid with said water vapor and for inducing upward flow of said liquid in said duct.

2. The apparatus defined in claim 1 wherein said vessel is provided with a succession of said treatment levels in vertically spaced relationship, and further comprising means for conducting said liquid from a higher first of said levels downwardly to a lower second of said levels upon flow of the respective body of liquid to an end of a path along a respective annular passage, said conducting means extending downward from said higher first to said lower second level.

3. The apparatus defined in claim 2, further comprising means for delivering said liquid to be deodorized to an uppermost one of said treatment levels at a beginning of the respective path of the liquid on said uppermost level.

4. The apparatus defined in claim 1 wherein each of said means for introducing water vapor is a respective annular conduit coaxial with the respective duct at the respective lower portion thereof and formed with a multiplicity of bores discharging water vapor into said liquid within the respective duct.

* * * * *